US008077808B2

(12) United States Patent
Someya

(10) Patent No.: US 8,077,808 B2
(45) Date of Patent: Dec. 13, 2011

(54) RADIO WAVE RECEIVER AND WAVE CLOCK

(75) Inventor: Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 527 days.

(21) Appl. No.: 12/353,361

(22) Filed: Jan. 14, 2009

(65) Prior Publication Data

US 2009/0185615 A1 Jul. 23, 2009

(30) Foreign Application Priority Data

Jan. 17, 2008 (JP) ................................ 2008-008132

(51) Int. Cl.
*H04L 27/06* (2006.01)

(52) U.S. Cl. ........ 375/340; 375/316; 375/342; 375/350; 368/46; 368/47

(58) Field of Classification Search .................. 375/316, 375/340, 342, 350; 368/46, 47
See application file for complete search history.

(56) References Cited

U.S. PATENT DOCUMENTS

2005/0195690 A1* 9/2005 Kondo .......................... 368/47
2007/0115759 A1* 5/2007 Sano .............................. 368/47

FOREIGN PATENT DOCUMENTS

JP 2007-139705 A 6/2007

* cited by examiner

*Primary Examiner* — Curtis Odom
(74) *Attorney, Agent, or Firm* — Holtz, Holtz, Goodman & Chick, PC

(57) ABSTRACT

Disclosed is a radio wave receiver including: a receiving unit to receive a radio wave including a time code in which a plurality of types of data pulse different in pulse width from one another are arranged with a predetermined period of time; a detection circuit to detect the time code in the radio wave received by the receiving unit to obtain a detected signal; a low-pass filter to pass low-frequency components in the detected signal detected by the detection circuit, a cutoff frequency of the low-pass filter being twice a transmit frequency of the data pulse or less; and a data distinction unit to distinguish the types of data pulse based on an output of the low-pass filter for at least one specific point of time during a transmit period of data pulse.

11 Claims, 14 Drawing Sheets

FIG.4

| CUTOFF FREQUENCY OF LPF | POINT A (0.2 SEC. POINT) | POINT B (0.5 SEC. POINT) | POINT C (0.8 SEC. POINT) |
|---|---|---|---|
| 5Hz | 0.998 | 1.00 | 1.00 |
| 2Hz | 0.919 | 0.998 | 1.00 |
| 1Hz | 0.715 | 0.956 | 0.993 |
| 0.5Hz | 0.467 | 0.792 | 0.919 |

FIG.7

| FILTER BAND (CUTOFF FREQUENCY) | 5Hz | 2Hz | 1Hz | 0.5Hz |
|---|---|---|---|---|
| S/N RATIO (dB) | 0 (BENCHMARK) | 4 | 7 | 10 |

RADIO WAVE RECEIVER AND WAVE CLOCK

CROSS-REFERENCE TO RELATED APPLICATIONS

This application is based upon and claims the benefit of priority from the prior Japanese Patent Application No. 2008-8132, filed on Jan. 17, 2008, and the entire contents of which are incorporated herein by reference.

BACKGROUND OF THE INVENTION

1. Field of the Invention

The present invention relates to a radio wave receiver that receives a radio wave and decodes a time code, and a wave clock that performs time calibration based on the time code.

2. Description of Related Art

It is known that a radio wave receiver module receives a standard radio wave including a time code and decodes the time code. It is also known that a wave clock is provided with such a radio wave receiver module for automatically correcting current time based on the decoded time code.

As to a standard radio wave in Japan, for example, amplitude of a carrier wave of 40 kHz or 60 kHz is modulated based on a time code. In areas where radio wave condition is poor, it may be difficult to receive radio waves properly due to radio signal attenuation or exogenous noise contamination.

In view of the foregoing, a technique for achieving reception of radio waves with high sensitivity even under poor radio wave condition is proposed. A technique disclosed in JP-A 2007-139705, for example, prevents a time code from being erroneously detected due to noise components by changing a threshold value for shaping a detected signal, depending on types of standard radio wave.

In a commonly used radio wave receiver module that receives a wide variety of radio waves, a low-pass filter may be provided at an output stage of a detection circuit for removing high-frequency noise in a baseband signal after detection. In such a structure, it is normal that the pass band of the low-pass filter is set so as not to greatly distort a waveform of the baseband signal. For example, assuming that a baseband signal is obtained under the condition that square waves whose pulse widths are 0.2 seconds, 0.5 seconds and 0.8 seconds each having a period of one second, are transmitted, it is normal that a cutoff frequency of the low-pass filter should be set to 5 Hz or higher.

Unfortunately, in the conventional technique for enhancing sensitivity in a radio wave receiver module, the sensitivity is not very high. For example, if a radio wave is contaminated by low exogenous noise, a time code can accurately be decoded. On the other hand, if the noise level is high enough to cause large attenuation of radio signals in a building, the time code cannot accurately be decoded.

SUMMARY OF THE INVENTION

It is, therefore, a main object of the present invention to provide a radio wave receiver and a wave clock both capable of accurately decoding a time code even if radio wave conditions are bad enough to cause large attenuation of signal levels.

According to a first aspect of the present invention, there is provided a radio wave receiver including: a receiving unit to receive a radio wave including a time code in which a plurality of types of data pulse different in pulse width from one another are arranged with a predetermined period of time; a detection circuit to detect the time code in the radio wave received by the receiving unit to obtain a detected signal; a low-pass filter to pass low-frequency components in the detected signal detected by the detection circuit, a cutoff frequency of the low-pass filter being twice a transmit frequency of the data pulse or less; and a data distinction unit to distinguish the types of data pulse based on an output of the low-pass filter for at least one specific point of time during a transmit period of data pulse.

According to a second aspect of the present invention, there is provided a wave clock including: the radio wave receiver; and a time calibration unit to correct time based on the time code after the types of data pulse are distinguished.

According to a third aspect of the present invention, there is provided a radio wave receiver including: a receiving unit to receive a radio wave including a time code in which a plurality of types of data pulse different in pulse width from one another are arranged with a predetermined period of time; a detection circuit to detect the time code in the radio wave received by the receiving unit to obtain a detected signal; a low-pass filter to pass low-frequency components in the detected signal detected by the detection circuit, when one of the types of data pulse which has a largest pulse is received, charges stored in the low-pass filter remaining at an end of a transmit period of the one of the types of data pulse; a data distinction unit to distinguish the types of data pulse based on an output of the low-pass filter for at least one specific point of time during a transmit period of data pulse; and a reset unit to remove the charges remaining in the low-pass filter every time the types of data pulse are distinguished by the data distinction unit.

According to a fourth aspect of the present invention, there is provided a wave clock including: the radio wave receiver; and a time calibration unit to correct time based on the time code after the types of data pulse are distinguished.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a table showing a relationship between cutoff frequencies of low-pass filters and output signal values of the filters;

FIG. 7 is a table showing S/N ratio-enhancing effects when using a narrow band low-pass filter;

DETAILED DESCRIPTION OF THE PREFERRED EMBODIMENT

Preferred embodiments of the present invention will be explained below with reference to the drawings.

First Embodiment

Figure 1:
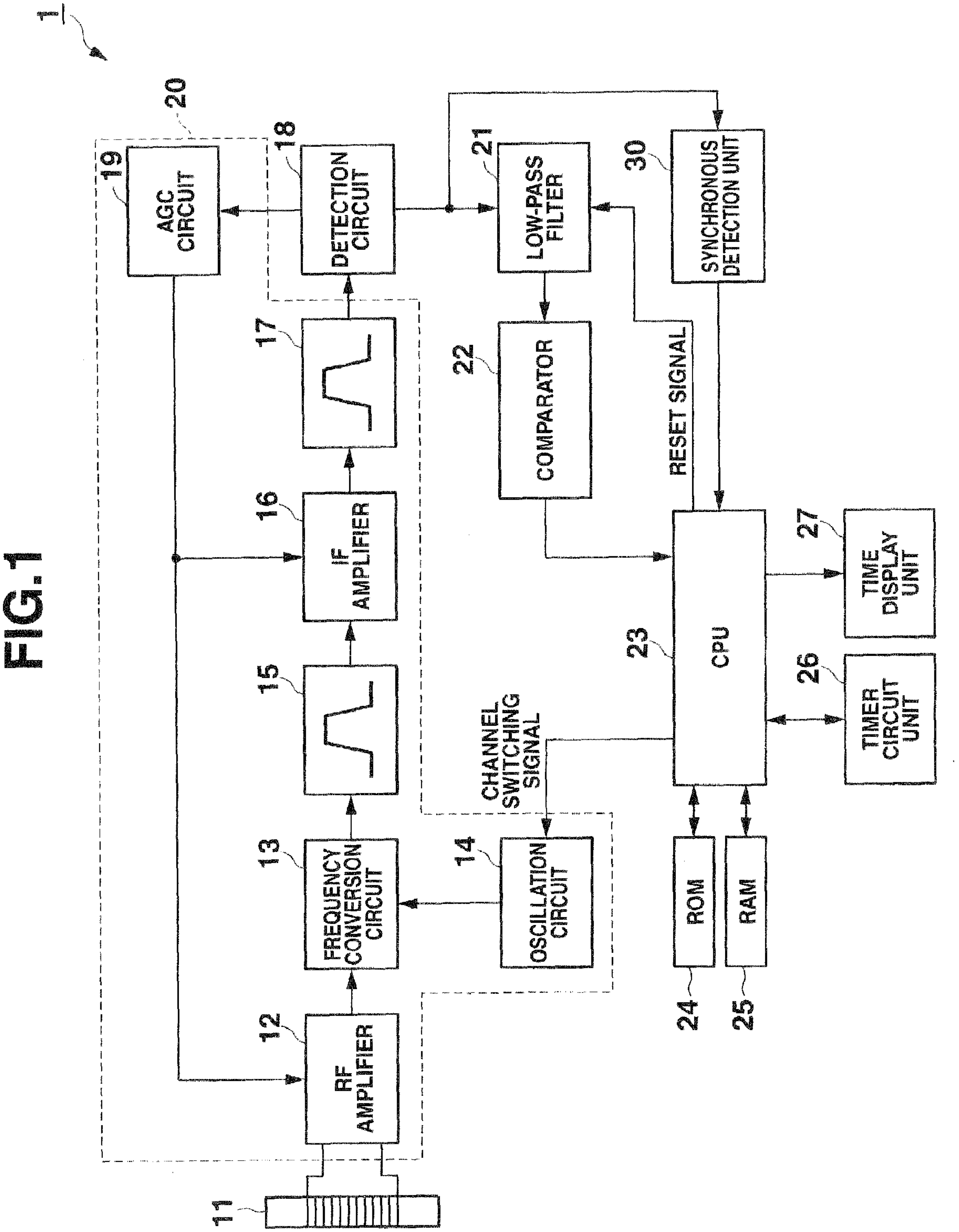
FIG. 1 is a block diagram showing a circuit configuration of a wave clock according to preferred embodiments of the present invention.

FIG. 1 is a block diagram showing a circuit configuration of a wave clock according to the embodiments of the present invention.

A wave clock 1 of the embodiment is a clock module that receives a standard radio wave including a time code and automatically corrects current time based on the time code. A main body of a wrist watch is an example of the wave clock 1.

The wave clock 1 includes: an antenna 11 for receiving a radio wave; a receiving unit 20 for receiving a standard radio wave including a time code with the antenna 11; a detection circuit 18 for detecting the time code in the standard radio wave to obtain a detected signal; a low-pass filter 21 and comparator 22 for signal processing with respect to the detected signal to distinguish between different types of data; a synchronous detection unit 30 for detecting synchronization points in the detected signal on the second time scale; a central processing unit (CPU) 23 for decoding the time code and controlling the respective units of the wave clock 1; and a ROM 24 for storing control programs executed by the CPU 23 and storing control data; a RAM 25 having a working memory for the CPU 23; a timer circuit unit 26 for measuring time to obtain measured time; and a time display unit 27 (such as an analog display unit or a liquid crystal display unit) for displaying time.

The receiving unit 20 includes: an RF amplifier 12 for amplifying signals received with the antenna 11; a frequency conversion circuit 13 for converting a signal having a specified frequency out of the received signals into a signal having an intermediate frequency; an oscillation circuit 14 for supplying a oscillation signal having a predetermined frequency to the frequency conversion circuit 13; a band-pass filter 15 for passing signals in an intermediate frequency band; an IF amplifier 16 for amplifying the signals in the intermediate frequency band; a band-pass filter 17 for removing a signal in an unwanted frequency band from the amplified signals; and an AGC circuit 19 for controlling a gain of the RF amplifier 12 and a gain of the IF amplifier 16 so that the detected signal with a constant level can be obtained. The detection circuit 18 detects the time code signal whose amplitude has been modulated, in the signals outputted from the band-pass filter 17.

The frequency of the oscillation signal of the oscillation circuit 14 can be switched between two channels under the control of the CPU 23. This makes the frequency of the standard radio wave to be received switch between 40 kHz and 60 kHz.

The CPU 23 controls the time display unit 27 so that the measured time measured by the timer circuit unit 26 can be synchronous with information displayed on the time display unit 27, during normal time, for example. When conditions for the standard radio wave to be received are established (e.g. at the time of receipt of the standard radio wave), the CPU 23 causes the receiving unit 20 and a peripheral circuit thereof to operate so that the standard radio wave can be received, and decodes the time code.

After the decoding, the CPU 23 compares time information that the time code represents, with the measured time measured by the timer circuit unit 26 When the time information is different from the measured time, the CPU 23 performs time calibration processing for correcting the difference automatically.

Figure 17:
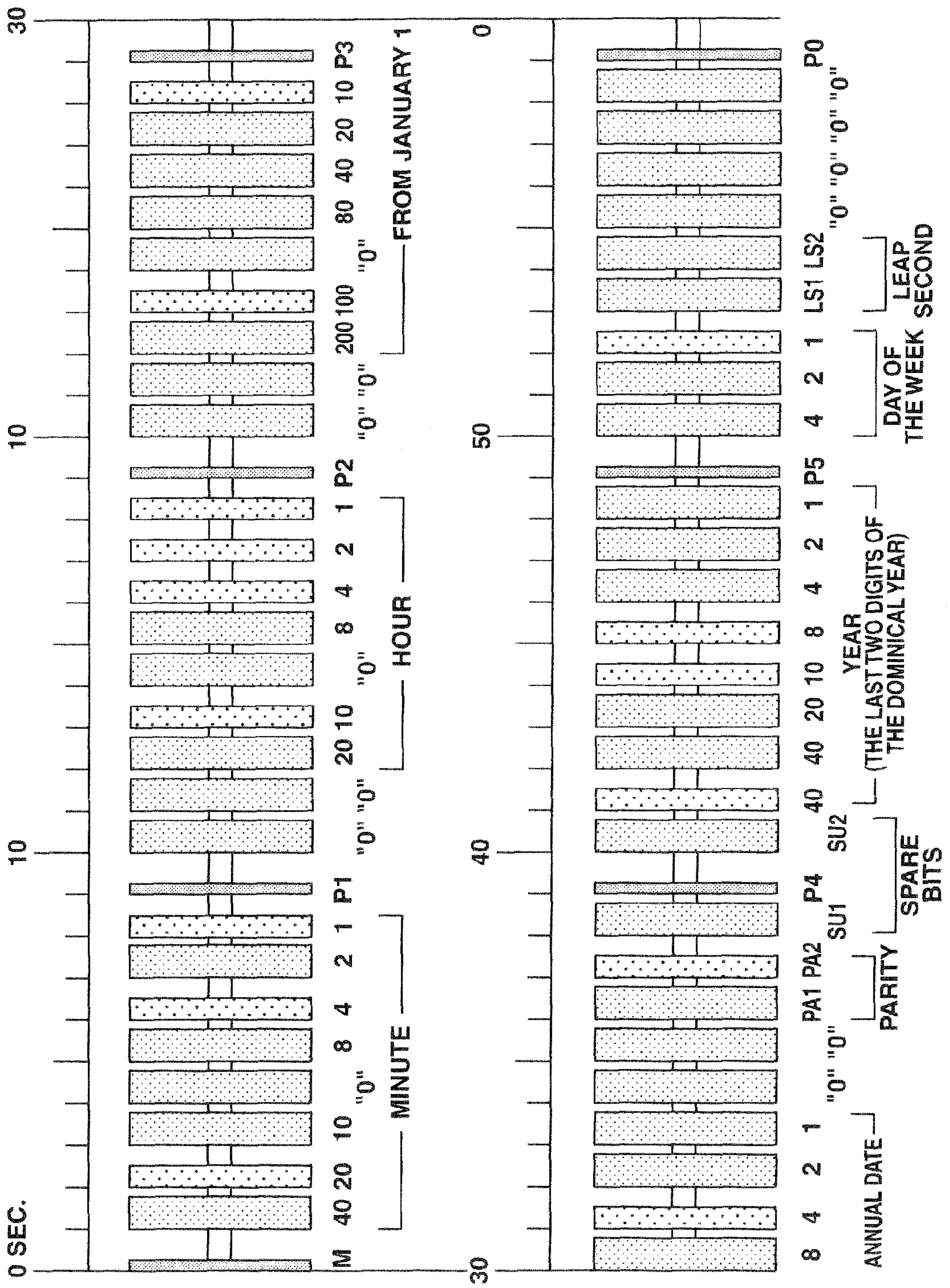
FIG. 17 shows a data chart depicting one example of a time code.
Figure 18A:
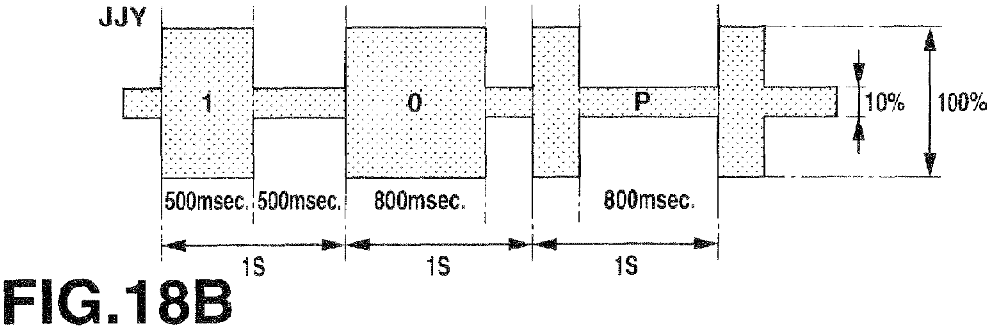
FIG. 18A shows waveforms of data pulses constituting a time code in Japan.
Figure 18B:
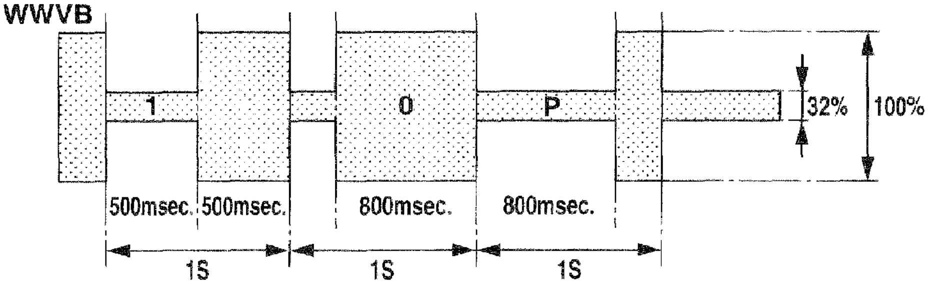
FIG. 18B shows waveforms of data pulses constituting a time code in the United States of America.
Figure 18C:
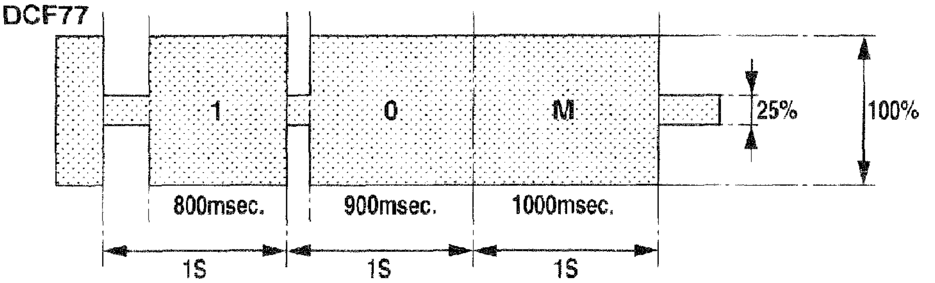
FIG. 18C shows waveforms of data pulses constituting a time code in Germany.
Figure 18D:
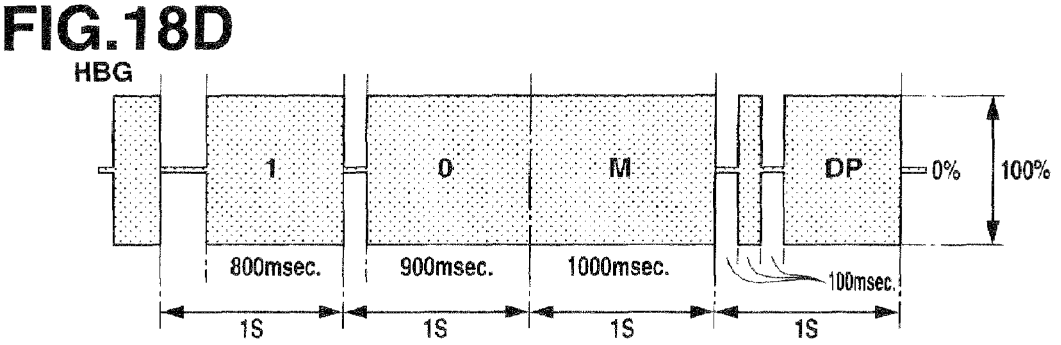
FIG. 18D shows waveforms of data pulses constituting a time code in Switzerland.
Figure 18E:
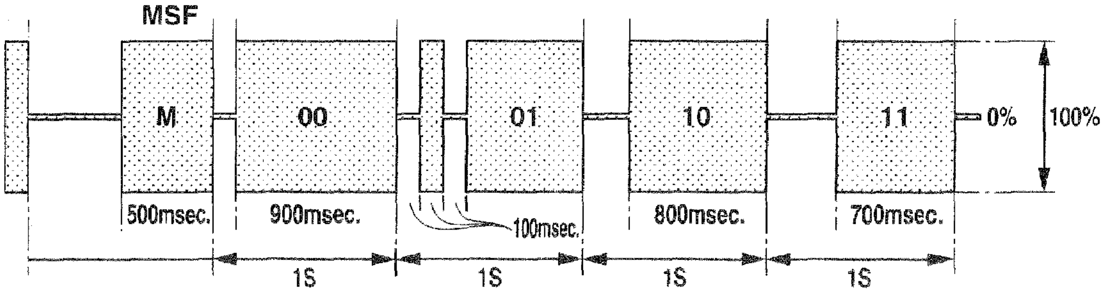
FIG. 18E shows waveforms of data pulses constituting a time code in the United Kingdom.

The synchronous detection unit 30 detects the synchronization points based on the detected signal (detection output) from the detection circuit 18. The synchronization points are decimal-zero points such as 0.0 sec. 1.0 sec, . . . , 59.0 sec. FIG. 17 shows a format diagram of a time code of a standard radio wave in Japan. As shown in FIG. 17, the rising edges of data pulses constituting the time code correspond to the respective synchronization points which exist on the second time scale.

The synchronous detection unit 30 includes a comparator that compares a time code signal with a predetermined threshold voltage. For example, the synchronization points are detected based on outputs of the comparator when the radio wave condition is good. That is, the output of the comparator is changed from a low level to a high level at rising edge timing of the time code signal, and the CPU 23 processes the rising edge timing as the synchronization point.

The synchronous detection unit 30 described above, which is simply-constructed, detects the synchronization points only when the radio wave condition is good. In some embodiments, a synchronous detection unit capable of detecting the synchronization points with a high degree of accuracy even when the radio wave condition is poor, may be employed.

At the end of the embodiments, configurations of some exemplary synchronous detection units capable of detecting the synchronization points even when the radio wave condition is poor, will be explained.

Figure 2:
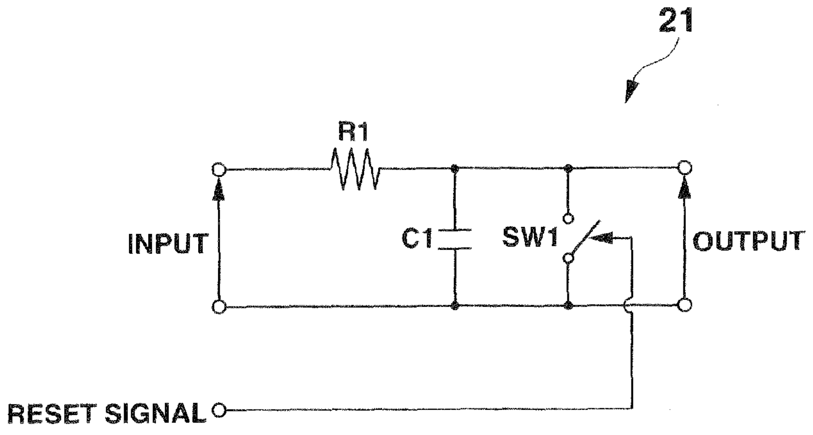
FIG. 2 shows a detailed circuit diagram of a low-pass filter.

FIG. 2 shows a detailed circuit diagram of the low-pass filter 21 shown in FIG. 1 according to the first embodiment of the present invention.

The low-pass filter 21 is a circuit that passes signals in a low-frequency band from the detection output of the detection circuit 18. For example, the low-pass filter 21 includes a RC filter circuit in which a resistance R1 and a capacitor C1 are series-connected and whose output is the voltage between both ends of the capacitor C1. In the embodiments, the pass band of the low-pass filter 21 is low enough to distort a waveform of the detected signal greatly, e.g., a cutoff frequency of 0.5 Hz.

This cutoff frequency is half the transmit frequency of each of the data pulses in the time code, and is extremely lower than a cutoff frequency for keeping the waveform of the time code (5 Hz or more). The cutoff frequency of the low-pass filter 21 may be set to a value which is preferably twice the transmit frequency of the each of the data pulses (1 Hz) or less, and more preferably 0.5 to 1.0 times as low as the transmit frequency of the each of the data pulses as will be described later on.

The low-pass filter 21 is provided with a switching element SW1 for resetting a state of the low-pass filter 21 by removing charges stored on the capacitor C1. For example, the switching element SW1 includes a transistor for off-on control by a reset signal outputted from the CPU 23.

Figure 3:
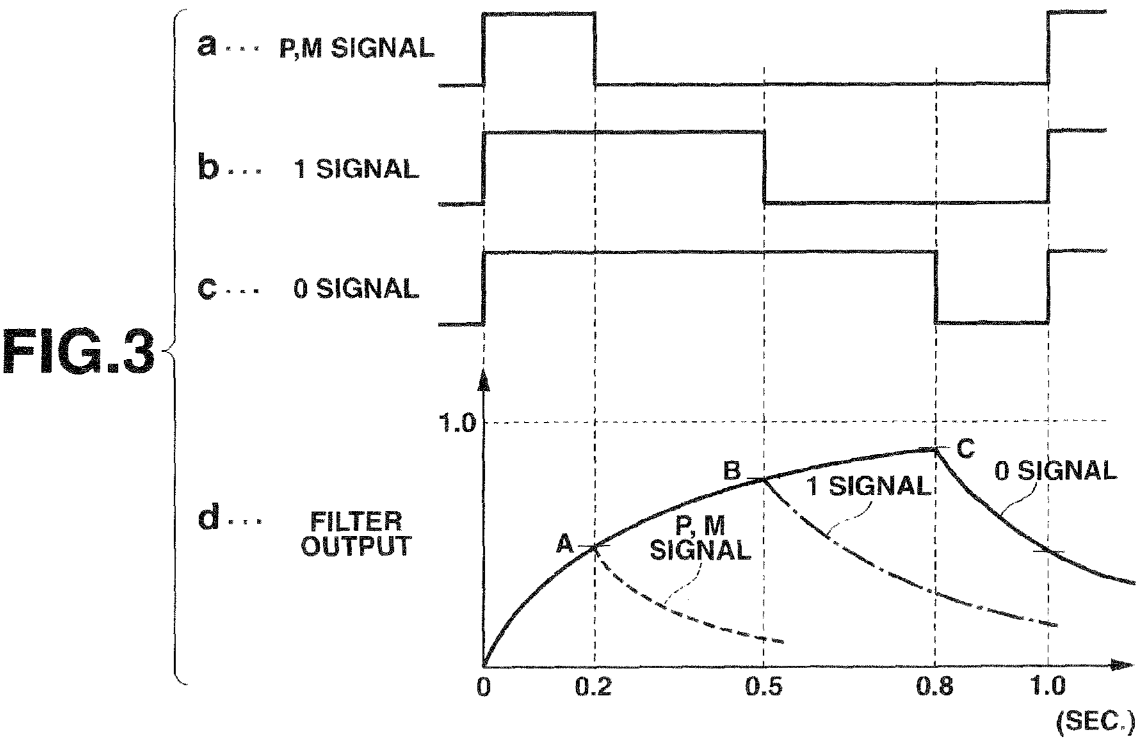
FIG. 3 shows a timing diagram indicating an operation of the low-pass filter, FIG. 3-(*a*) shows a waveform of detected P and M signals, FIG. 3-(*b*) shows a waveform of detected "1" signal, FIG. 3-(*c*) shows a waveform of detected "0" signal, and FIG. 3-(*d*) shows a waveform of a filter output.
Figure 6:
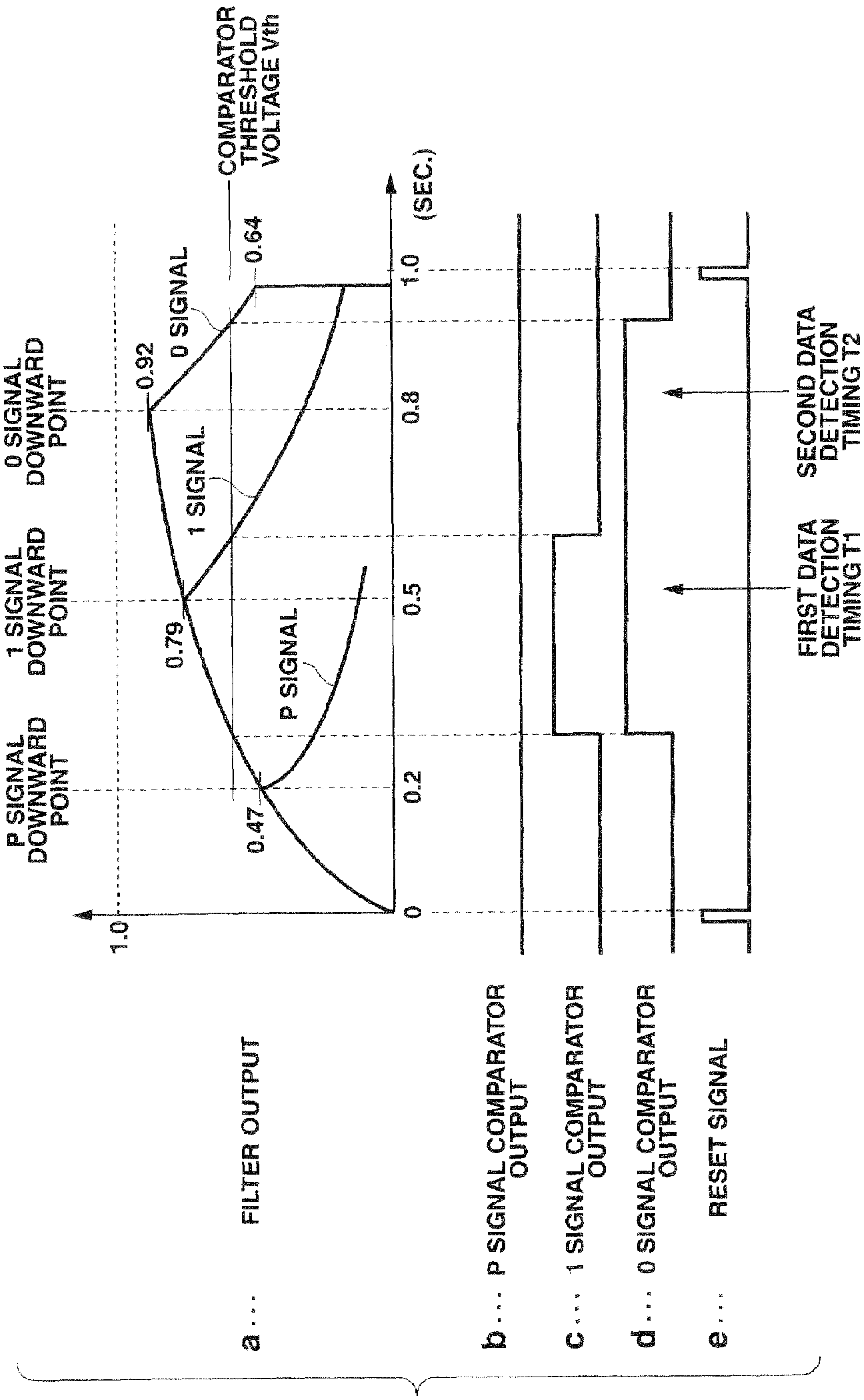
FIG. 6 shows a timing chart for explaining a distinction method of data pulse according to the embodiments of the present invention, FIG. 6-(*a*) shows waveforms of outputs of the low-pass filter, FIG. 6-(*b*) shows a waveform of a comparator output of P signal, FIG. 6-(*c*) shows a waveform of a comparator output of “1” signal, FIG. 6-(*d*) shows a waveform of a comparator output of “0” signal, and FIG. 6-(*e*) shows a waveform of a reset signal.

The comparator 22 compares a predetermined threshold voltage Vth (see FIG. 6-(*a*)) with an output of the low-pass filter 21, and outputs a high level signal or a low level signal each representing the comparison result, to the CPU FIG. 3 shows a timing diagram indicating an operation of the low-pass filter 21. FIG. 3-(*a*), FIG. 3-(*b*) and FIG. 3-(*c*) show idealized waveforms of detected P and M signals, "1" signal, and "0" signal, respectively. FIG. 3-(*d*) shows a waveform of a filter output.

The time code of the standard radio wave in Japan includes three types of data pulse which are P and M signals, "1" signal and "0" signal. As shown in FIG. 3-(*a*), the P signal is a signal which has a rising edge at the synchronization point and whose pulse width is 0.2 second. The P signal is a position marker pulse indicating a position of a frame delimiter in the time code.

The M signal is a signal whose waveform is the same as that of P signal. The M signal is a frame marker pulse indicating a starting position of a frame in the time code. As shown in FIG. 3-(*b*), "1" signal is a signal which has a rising edge at the synchronization point and whose pulse width is 0.5 second. The "1" signal shows a data value "1". As shown in FIG. 3-(*c*), "0" signal is a signal which has a rising edge at the synchronization point and whose pulse width is 0.8 second. The "0" signal shows a data value "0".

The low-pass filter 21 changes waveforms of the respective data pulse signals as shown in FIG. 3-(*d*) because of the narrow band-pass characteristics. That is, each of the waveforms of the P signal and M signal, each having the smallest pulse width, is changed such that amplitude increases gradually during a high level period of the pulse, reaches the maximum amplitude (point A) at 0.2 second point corresponding to a downward edge of the pulse, and then attenuates gradually.

The waveform of the "1" signal with a medium pulse width is changed such that amplitude increases gradually during a high level period of the pulse, exceeding the point A, reaches the maximum amplitude (point B) at 0.5 second point corresponding to a downward edge of the pulse, and then attenuates gradually.

The waveform of the "0" signal with the largest pulse width is changed such that amplitude increases gradually during a high level period of the pulse, exceeding the points A and B, reaches the maximum amplitude (point C) at 0.8 second point corresponding to a downward edge of the pulse, and then attenuates gradually.

With respect to the "1" signal and "0" signal, since the charges remain in the low-pass filter 21 at 1.0 second point at which a next data pulse is received, an output value of the low-pass filter 21 exceeds an initial value.

Figure 5:
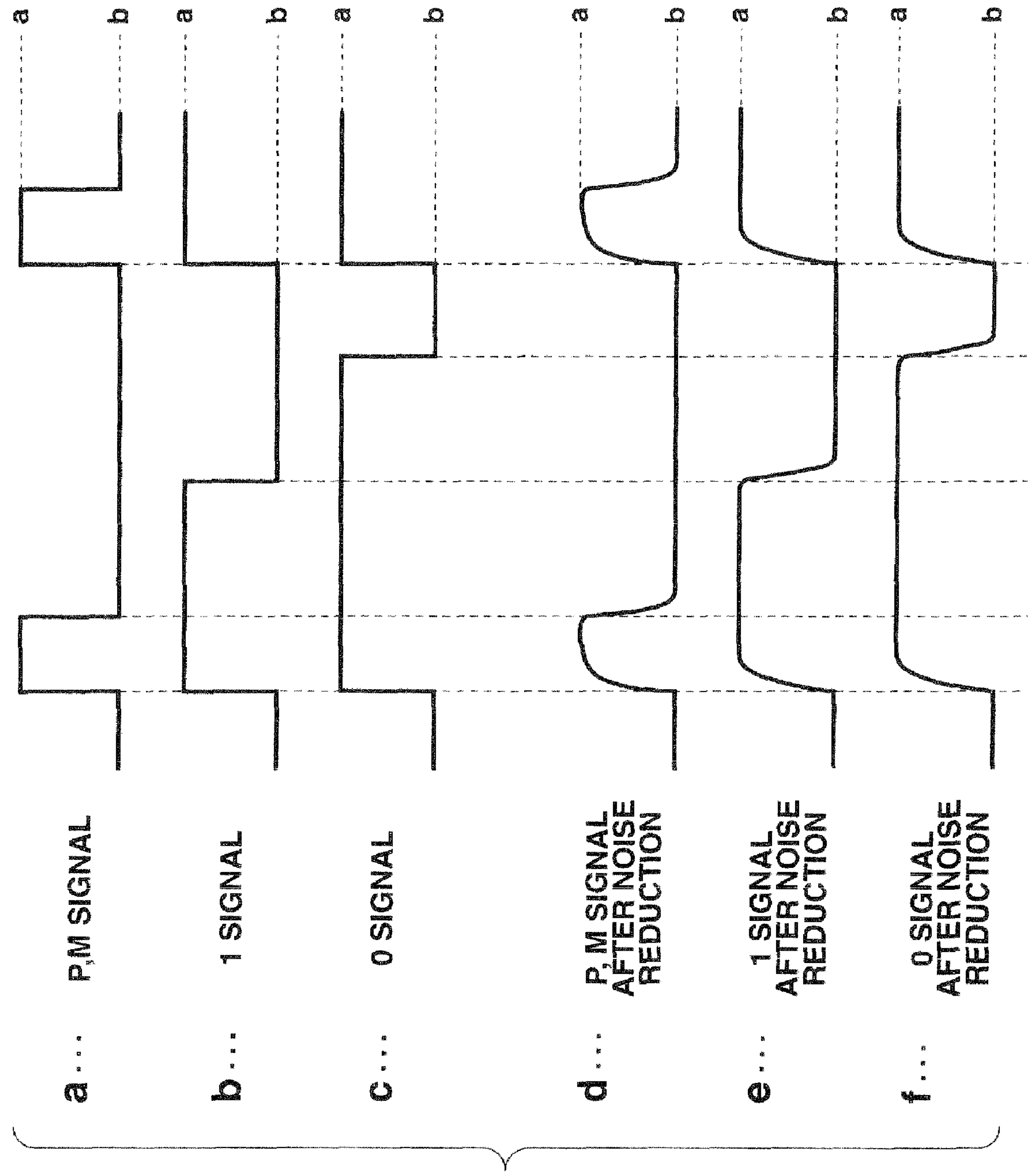
FIG. 5 shows waveforms of signals when using a low-pass filter with a commonly-used frequency band, FIG. 5-(*a*) shows a waveform of each of P signal and M signal after detection, FIG. 5-(*b*) shows a waveform of "1" signal after detection, FIG. 5-(*c*) shows a waveform of "0" signal after detection, FIG. 5-(*d*) shows a waveform of each of P signal and M signal after the signal P signal or M signal is passed through the filter, FIG. 5-(*e*) shows a waveform of "1" signal after the signal is passed through the filter, and FIG. 5-(*f*) shows a waveform of "0" signal after the signal is passed through the filter.

FIG. 4 is a table showing a relationship between cutoff frequencies of a low-pass filter and output signal values of the filter. FIG. 5-(*a*), FIG. 5-(*b*) and FIG. 5-(*c*) show waveforms of original signals. FIG. 5-(*d*), FIG. 5-(*e*) and FIG. 5-(*f*) show waveforms of the signals after the signals are passed through a low-pass filter with a commonly-used frequency band.

FIG. 4 shows amplitude values of output signals of low-pass filters at points A, B and C in FIG. 3-(*d*) at four different cutoff frequencies under the condition that an amplitude value of a data pulse at a high level is "1".

A distortion amount of a signal waveform after the signal is passed through a low-pass filter depends on the cutoff frequency of the low-pass filter. When the cutoff frequency is about 5 Hz which is a commonly-used frequency, although a low-passed signal which has been passed through the low-pass filter is slightly deformed at a rising portion and a downward portion of the signal in comparison with an original pulse signal, a waveform of the low-passed signal is almost the same as that of the original pulse signal as shown in FIG. 5.

On the other hand, the cutoff frequency of the low-pass filter 21 is 2 Hz or less in the embodiments, which causes the waveform of the filter output to be quite different from that of the original pulse signal as shown in FIG. 3-(*d*). As shown in FIG. 4, when the cutoff frequency is 2 Hz, the low-passed signal is slightly steeper at a rising portion thereof, and amplitude values of the low-passed signals at points A and B are a little bit larger, in comparison with the low-passed signals shown in FIG. 3-(*d*). As the cutoff frequency is lower (e.g. 1 Hz or 0.5 Hz), the low-passed signals have gentler slopes at rising portions thereof, and amplitude values of the low-passed signals at points A, B and C become smaller.

A conventional method for distinguishing between different types of data pulse is implemented by measuring a pulse width. If this conventional method is employed, the lower the cutoff frequency, the more difficult it is to distinguish between different types of data pulse For example, the smaller the amplitude value of point A, the more difficult it is to measure the pulse width when the P signal or M signal is inputted.

To avoid this disadvantage, the following method will be employed in this embodiment to distinguish between different types of data pulse.

FIG. 6 shows a timing chart for explaining a distinction method of data pulse according to the embodiments of the present invention. FIG. 6-(*a*) shows outputs of the low-pass filter 21. FIG. 6-(*b*), FIG. 6-(*c*) and FIG. 6-(*d*) show comparator outputs of P signal, "1" signal and "0" signal, respectively. FIG. 6-(*e*) shows a reset signal.

In the data distinction processing according to the embodiments, first, the output of the low-pass filter 21 is compared with a threshold voltage Vth by the comparator 22. A value of the threshold voltage Vth is set to about half the amplitude of each of the data pulses. If the cutoff frequency of the low-pass filter 21 is set relatively low such as 0.5 Hz, the threshold voltage Vth may be larger than the amplitude value of the filter output at point A. On the other hand, if the cutoff frequency of the low-pass filter 21 is set relatively large such as 2 Hz, the amplitude value of the filter output at point A may be larger than the threshold voltage Vth.

In the data distinction processing, the reset signal is outputted from the CPU 23 just before each of the synchronization points (FIG. 6-(*e*)). This reset signal causes the charges stored in the low-pass filter 21 to be removed. Accordingly, since each of the filter outputs is reset to the initial value (zero) at each of the synchronization points, it is possible to avoid the disadvantage that the output of the low-pass filter 21 exceeds the initial value at the next synchronization point due to the previously received data pulse.

The CPU 23 also reads output values of the comparator 22 at least two timing, i.e. first data detection timing T1 and second data detection timing T2, both of which are set based on the synchronization points The CPU 23 distinguishes between three different types of data pulse based on the output values.

The first data detection timing T1 is set in the vicinity of timing at which amplitude difference between the filter output of P signal and the filter output of "1" signal reaches a maximum, i.e. in the vicinity of a downward point of the "1" signal. The second data detection timing T2 is set in the vicinity of timing at which amplitude difference between the filter output of "0" signal and the filter output of "1" signal reaches a maximum, i.e. in the vicinity of a downward point of the "0" signal.

When both of the comparator output at the first data detection timing T1 and the comparator output at the second data detection timing T2 are low-level, P signal or M signal is determined as types of data pulse When the comparator output at the first data detection timing T1 is high-level and the comparator output at the second data detection timing T2 is low-level, "1" signal is determined as types of data pulse. When both of the comparator output at the first data detection timing T1 and the comparator output at the second data detection timing T2 are high-level, "0" signal is determined as types of data pulse FIG. 7 is a table showing S/N ratio-enhancing effects when using a narrow band low-pass filter.

In general, if a signal passes through a low-pass filter, amount of noise in the signal depends on a pass band width of the low-pass filter. Assuming that the signal level is not lowered, the narrower the pass band width of the low-pass filter, the more the S/N ratio is enhanced as shown in FIG. 7. For example, suppose that a cutoff frequency of 5 Hz is used as a benchmark. The S/N ratio increases by 4 dB if a low-pass filter with a cutoff frequency of 2 Hz is employed, and the S/N ratio increases by 10 dB if a low-pass filter with a cutoff frequency of 0.5 Hz is employed. Here, it is possible to reduce white noise as well as exogenous pulsed noise by a low-pass filter.

If a signal passes through the narrow band low-pass filter 21, it is disadvantageous in that a waveform of the signal is greatly distorted and the signal level is lowered. A signal with a smaller pulse width has a tendency to decrease in signal level as compared with a signal with a larger pulse width.

Therefore, the band characteristics of the low-pass filter 21 can be optimized in view of a noise reduction effect and an effect of decrease in signal level. The disadvantage due to the waveform distortion can be reduced by using the above-described method for distinguishing between different types of data pulse in response to the waveform distortion.

With respect to the band characteristics of the low-pass filter 21, if the cutoff frequency of the low-pass filter 21 is 2 Hz or less, the noise reduction effect of 4 dB or more can be achieved as compared with a low-pass filter with a cutoff frequency of 5 Hz as a benchmark.

If the cutoff frequency is as low as 0.2 Hz, because a maximum signal level becomes extremely low even in "0" signal with the largest pulse width, the S/N ratio-enhancing effects are reduced. Accordingly, in a time code including data pulses with a transmit frequency of 1 Hz, using the low-pass filter 21 having a cutoff frequency within the range of 0.3 Hz to 2 Hz, the S/N ratio-enhancing effects can be remarkably achieved.

More preferably, using the low-pass filter 21 having a cutoff frequency within the range of 0.5 Hz to 1 Hz, drastic reduction in amount of noise can be achieved without decreasing the signal level of "0" signal or "1" signal very much. This noise reduction is more effective in S/N ratio enhancement.

Next, a standard time receiving processing executed based on the above-described configuration will be explained.

Figure 8:
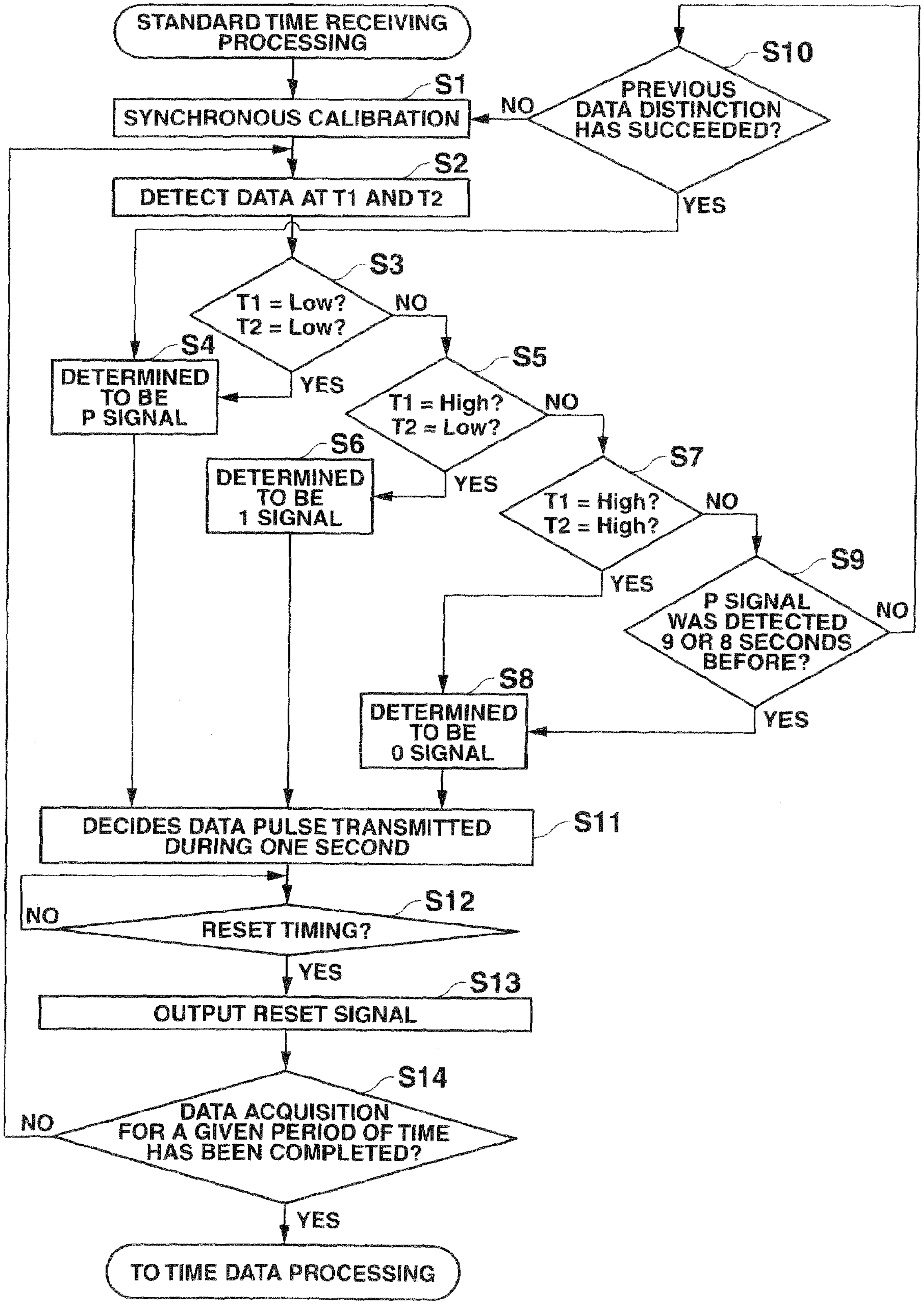
FIG. 8 shows a flowchart depicting a standard time receiving processing executed by CPU.

FIG. 8 shows a flowchart depicting the standard time receiving processing executed by the CPU 23.

The standard time receiving processing is started by the CPU 23 when predetermined conditions are met, e.g. at a preset time, or when a predetermined operation is performed.

When the standard time receiving processing is started, the CPU 23 causes the receiving unit 20 and the synchronous detection unit 30 to detect the synchronization points (decimal-zero points), and performs synchronous calibration for synchronizing the internal counter values of the CPU 23 with the synchronization points (step S1).

If the synchronous detection unit 30 detects the synchronization points only when the radio wave condition is good, the synchronous calibration may be performed when the radio wave condition is good, and the CPU 23 may determine that the synchronous calibration is ended and move into the next step if time does not pass so much from this synchronous calibration.

If synchronous detection units 30A, 30B and 30C (described later on), each of which detects the synchronization points even when the radio wave condition is poor, are employed, the synchronous calibration of step S1 can be performed any time, regardless of whether the radio wave condition is good or not. After such a synchronous calibration, a time code receiving processing will be started.

In the time code receiving processing, first, outputs of the comparator 22 are read at the first data detection timing T1 and the second data detection timing T2 (see FIG. 6), both of which are set based on the synchronization points, in synchronization with the internal counter value (step S2).

Next, distinction processing of data pulses is performed based on the outputs of the comparator 22 in steps S3, S5 and S7. That is, when both of the comparator outputs at the first data detection timing T1 and the second data detection timing T2 are low-level, the CPU 23 moves into step S4 from step S3 and determines this data pulse as P signal.

When the comparator output at the first data detection timing T1 is high-level and the comparator output at the second data detection timing T2 is low-level, the CPU 23 moves into step S6 from step S5 and determines this data pulse as "1" signal.

When both of the comparator outputs at the first data detection timing T1 and the second data detection timing T2 are high-level, the CPU 23 moves into step S8 from step S7 and determines this data pulse as "0" signal. This distinction processing has been described with reference to FIG. 6.

If the comparator outputs at the first data detection timing T1 and the second data detection timing T2 fall into none of the output patterns described above, that is, the comparator output at the first data detection timing T1 is low-level and the comparator output at the second data detection timing T2 is high-level, the CPU 23 determines that one or more transmission errors have occurred due to noise, and makes the following determination.

That is, the CPU 23 determines this data pulse as P signal or "0" signal because such an output pattern is similar to a pattern of P signal or "0" signal.

The CPU 23 refers to previously-detected data pulses to use the data pulses in the present distinction processing of data pulses. Specifically, the CPU 23 checks whether P signal was detected or not in the distinction processing of data pulses that executed 9 or 8 seconds before (step S9). In step S9, if the P signal was detected 9 or 8 seconds before, the CPU 23 determines that the present data pulse is most likely to be P signal, and moves into step S10.

This determination is based on the fact that P signal (or M signal) is transmitted both at 0 second and at the last digit 9 seconds according to a format of the time code.

On the other hand, if P signal was not detected in step S9, the CPU 23 moves into step S8 to determine that the present data pulse is "0" signal because there is a high possibility of "0" signal.

If the CPU 23 moves into step S10 because there is a high possibility of P signal, the CPU 10 checks whether the previous distinction processing of data pulses has succeeded or not in step S10. If the previous distinction processing of data pulses has succeeded, the CPU 23 determines that the present data pulse is most likely to be P signal, and moves into step S4 to determine the present data pulse as P signal.

On the other hand, if the CPU 23 confirms that the previous distinction processing of data pulses has also resulted in failure in step S10, the reception status is determined as being unstable because the transmission errors have occurred successively, and the CPU 23 returns to step S1 to restart the synchronous calibration.

After the data pulse is determined by the distinction processing of data pulses described above, the CPU 23 decides the distinction result as the data pulse that has been transmitted during a present transmit period of one second (step S11).

After the data pulse is decided, the CPU 23 stands by for the next synchronization rest timing (step S12). At the rest timing, the CPU 23 outputs the reset signal to the low-pass filter 21 (step S13, see FIG. 6-(*e*)). This reset signal causes the charges stored in the low-pass filter 21 to be removed at the next synchronization point.

Next, the CPU 23 determines whether the data pulse acquisition for a given period of time (e.g., 2 minutes or 3 minutes) has been completed (step S14). If the data pulse acquisition has not been completed, the CPU 23 returns to step S2 to receive a data pulse for the next period of one second and perform the data distinction.

By iterating steps S2 through S14 for a given period of time, the distinction processing of data pulses in the time code which has been transmitted for a given period of time is performed. After the data pulse acquisition for a given period of time has been completed, the standard time receiving processing is ended.

After the standard time receiving processing, the CPU 23 moves into time data processing that corrects current time data based on the received time code. A flowchart of the time data processing is omitted. In the time data processing, the CPU 23 decodes the time code to get time information indicating date and current time based on a format shown in FIG. 17, compares the time information with the measured time measured by the timer circuit unit 26, and checks whether the time information corresponds to the measured time or not.

If the time information corresponds to the measured time, the time data processing is ended. On the other hand, if the time information does not correspond to the measured time, the CPU 23 corrects the measured time measured by the timer circuit unit 26 so as to synchronize the measured time with the time represented by the time code. In this way, the current time of the wave clock 1 can be automatically corrected. The CPU 23 continues to control the time display unit 27 until the next standard time receiving processing.

According to the wave clock 1 and a radio wave receiver (which includes the receiving unit 20, the low-pass filter 21, the comparator 22, the CPU 23 and the synchronous detection unit 30) of this embodiment, because the pass band of the low-pass filter 21 is low enough to distort a waveform of the detected signal greatly for noise reduction, S/N ratio of the received signal can be remarkably enhanced. Therefore, it is possible to perform the data distinction accurately even in areas where radio wave condition is poor.

The data distinction is not performed by detecting a waveform of the original data pulse, such as measuring a pulse width of the data pulse. The data distinction is performed in response to a waveform deformed by the low-pass filter 21. Therefore, it is possible to perform the data distinction accurately based on the S/N ratio-enhanced signal.

Since the low-pass filter 21 is configured to reset outputs thereof by removing the stored charges, continuous reception of the respective data pulses in the time code can be achieved by resetting the respective outputs of the low-pass filter 21 at the respective synchronization points.

The CPU 23 reads two pieces of data outputted from the comparator 22 at the first data detection timing T1 and the second data detection timing T2. Since the data distinction is performed based on the two pieces of data, a processing load of this data distinction can be remarkably low as compared with other data distinction performed by sampling the received signals at a high frequency.

The first data detection timing T1 is set to the timing at which the difference between the filter output of P signal and the filter output of "1" signal reaches a maximum. The second data detection timing T2 is set to the timing at which the difference between the filter output of "0" signal and the filter output of "1" signal reaches a maximum. Accordingly, in addition to the low processing load, the data distinction allows minimization of error.

If the data distinction, which is based on the outputs at the first data detection timing T1 and the second data detection timing T2, has resulted in failure, the CPU 23 refers to previously-distinguished data pulses (which are distinguished 9 or 8 seconds before) to try to perform the data distinction again (step S9 in FIG. 8). Therefore, distinction error of data pulses can be maximally avoided even if the data pulses are contaminated with large amounts of noise.

If the data distinction has resulted in failure successively, the synchronous calibration is restarted in the standard time receiving processing (step S10 in FIG. 8). Therefore, it is possible to correct a reception error due to out-of-synchronization and to promptly return to normal receiving processing.

Second Embodiment

Figure 9:
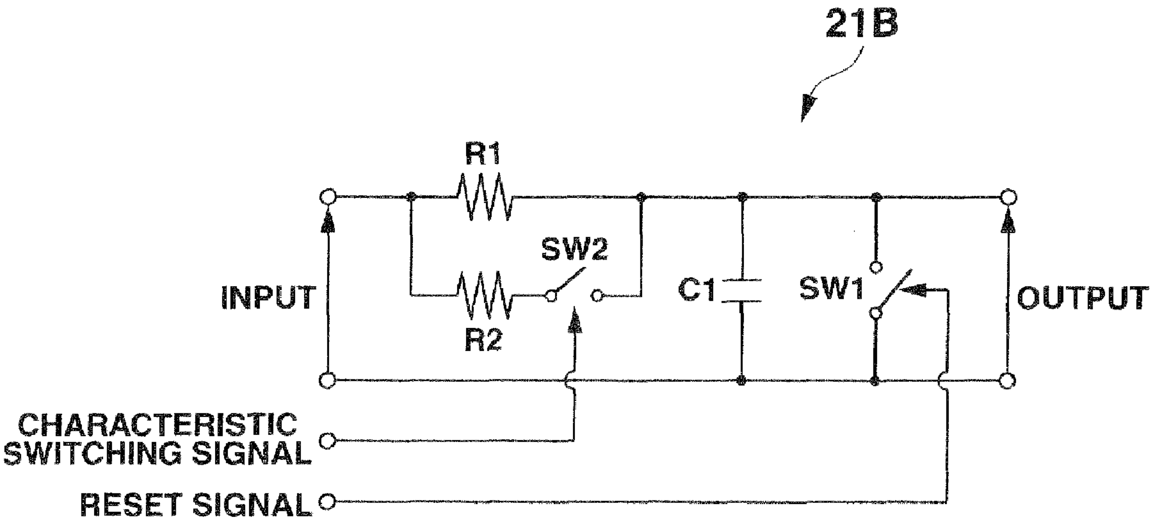
FIG. 9 is a block diagram showing a circuit configuration of a low-pass filter according to a second embodiment of the present invention.

FIG. 9 is a block diagram showing a circuit configuration of a low-pass filter 21B according to the second embodiment of the present invention.

In the second embodiment, the low-pass filter 21 shown in FIG. 1 is replaced with the low-pass filter 21B shown in FIG. 9, and the standard time receiving processing of the first embodiment is slightly modified.

As shown in FIG. 9, the low-pass filter 21B of the second embodiment is switchable between two pass band characteristics (a first band and a second band) by a characteristic switching signal outputted from the CPU 23. In the low-pass filter 21B, a resistance R1 and a capacitor C1 are series-connected, and an output of the low-pass filter 21B is the voltage between both ends of the capacitor C1. In addition to this configuration, the low-pass filter 21B includes a second resistance R2 which can be connected in parallel to the resistance R1, and a switching element SW2. The low-pass filter 21B also includes a switching element SW1 for a reset.

According to the low-pass filter 21B, when switching to on-state by the switching element SW2, a cutoff frequency of the low-pass filter 21B can be lowered from 1 Hz to 0.5 Hz, or from 0.5 Hz to 0.4 Hz, for example.

In the standard time receiving processing of the second embodiment, the pass band characteristics of the low-pass filter 21B is kept at the first pass band from the start of the processing to the halfway point, and switched to the second pass band in the middle of the processing (e.g., 1 Hz→0.5 Hz or 0.5 Hz→0.4 Hz).

Specifically, at first, as with the first embodiment, the data pulse distinction processing is carried out every one second from the start of the processing. After the synchronization is accomplished on a minute time scale by detecting P signal at 59 seconds point and M signal at 0 second point, the distinction processing will be omitted during the subsequent transmit periods of P signal because all the subsequent transmit timing of P signal is identified. During the subsequent transmit periods of other signals, the distinction processing of "1" signal and "0" signal will be carried out, and the distinction processing of P signal will be omitted.

In addition to the process switching described above, the moment the subsequent transmit timing of P signal is identified, the CPU 23 outputs the characteristic switching signal to the low-pass filter 21B to switch to a lower pass band. That is, since the distinction processing is carried out with respect to signals with larger pulse widths except P signal with a smaller pulse width, the pass band of the low-pass filter 21B is lowered. This switching is highly effective in noise reduction and S/N ratio-enhancement. After the switching, the distinction processing of "1" signal and "0" signal will be carried out based on the output through the low-pass filter 21B.

Figure 10:
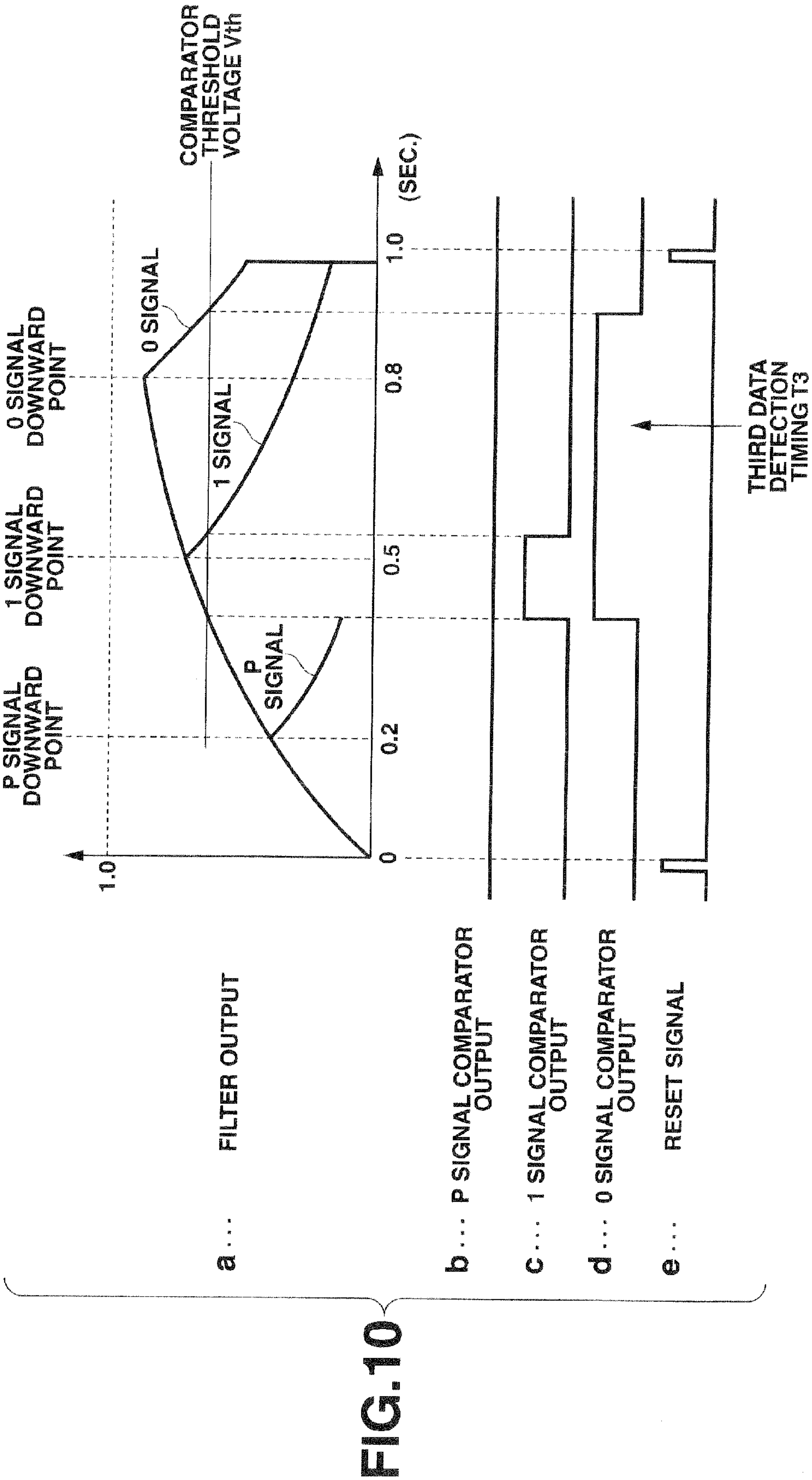
FIG. 10 shows a timing chart for explaining a distinction method of data pulse after detecting P signals according to the second embodiment of the present invention, FIG. 10-(*a*) shows waveforms of outputs of the low-pass filter, FIG. 10-(*b*) shows a waveform of a comparator output of P signal, FIG. 10-(*c*) shows a waveform of a comparator output of “1” signal, FIG. 10-(*d*) shows a waveform of a comparator output of “0” signal, and FIG. 10-(*e*) shows a waveform of a reset signal.

FIG. 10 shows a timing chart for explaining a distinction method of data pulse after detecting the P signals according to the second embodiment of the present invention. FIG. 10-(*a*) shows outputs of the low-pass filter 21B. FIG. 10-(*b*), FIG. 10-(*c*) and FIG. 10-(*d*) show comparator outputs of P signal, "1" signal and "0" signal, respectively. FIG. 10-(*e*) shows a reset signal.

As shown in FIG. 10, when the distinction processing of P signal is not carried out, the CPU 23 reads an comparator output at a third data detection timing T3 and determines whether the data pulse is "1" signal or "0" a signal, based on the comparator output. Comparing FIG. 6 with FIG. 10, it is found that the waveforms of the filter outputs of "1" signal and "0" signal are changed so that maximums of the filter outputs are lowered.

Accordingly, pulse widths of the comparator outputs of "1" signal and "0" signal are also changed. In response to such a change, the third data detection timing T3 may be set to the timing at which most reliable determination of data pulse ("1" signal and "0" signal) is made. At the same time, the threshold voltage vth of the comparator 22 may be switched to an appropriate value.

The distinction processing of "1" signal and "0" signal is carried out within a given period of time. When the distinction of the data pulses is ended, the standard time receiving processing is ended and the CPU 23 moves into the time data processing that corrects current time data based on the received time code.

According to the wave clock and a radio wave receiver of the second embodiment, when the transmit timing of P signal is identified, the characteristics of the lowpass filter 21B is switched to a lower band to carry out the distinction processing of "1" signal and "0" signal. Therefore, S/N ratio of the filter output in the distinction processing is more enhanced, and more accurate data distinction processing can be accomplished.

In the second embodiment, the low-pass filter 21B of the second embodiment is switchable between the low first band characteristics and the even lower second band characteristics. The low-pass filter 21B may be switchable between common band characteristics and low band characteristics. In this case, usually the conventional receiving processing in the common band characteristics may be carried out, whereas switching to lower band characteristics when the radio wave condition is poor to carry out the receiving processing of the second embodiment.

A first example of a synchronous detection unit capable of detecting the synchronization points of a time code even when the radio wave condition is poor, will be explained below.

FIRST EXAMPLE OF SYNCHRONOUS DETECTION UNIT

Figure 11:
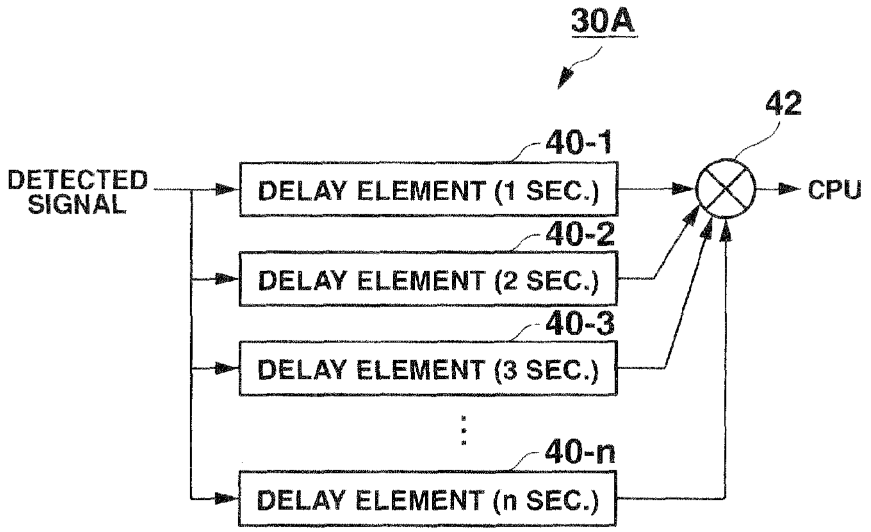
FIG. 11 is a block diagram showing a first exemplary synchronous detection unit capable of detecting synchronization points even when radio wave condition is poor.

FIG. 11 is a block diagram showing a first exemplary synchronous detection unit 30A capable of detecting the synchronization points even when the radio wave condition is poor.

The synchronous detection unit 30A includes a plurality of delay elements 40-1 to 40-*n* by which an input time code signal is delayed by predetermined amounts of time, and an adder 42 for combining output signals of the respective delay elements 40-1 to 40-*n*.

The delay times of the delay elements 40-1 to 40-*n* are 1 second, 2 seconds, 3 seconds, . . . , n seconds, respectively. That is, the delay difference between two adjacent delay elements is 1 second. A transmit period of each of the data pulses in the time code is 1 second.

The adder 42 combines the output signals of the delay elements 40-1 to 40-*n* by adding amplitudes of the respective output signals to generate a combination signal. The adder 42 may output the combination signal without change. The adder 42 may output the combination signal by reducing the amplitude thereof by a fixed ratio.

Figure 12:
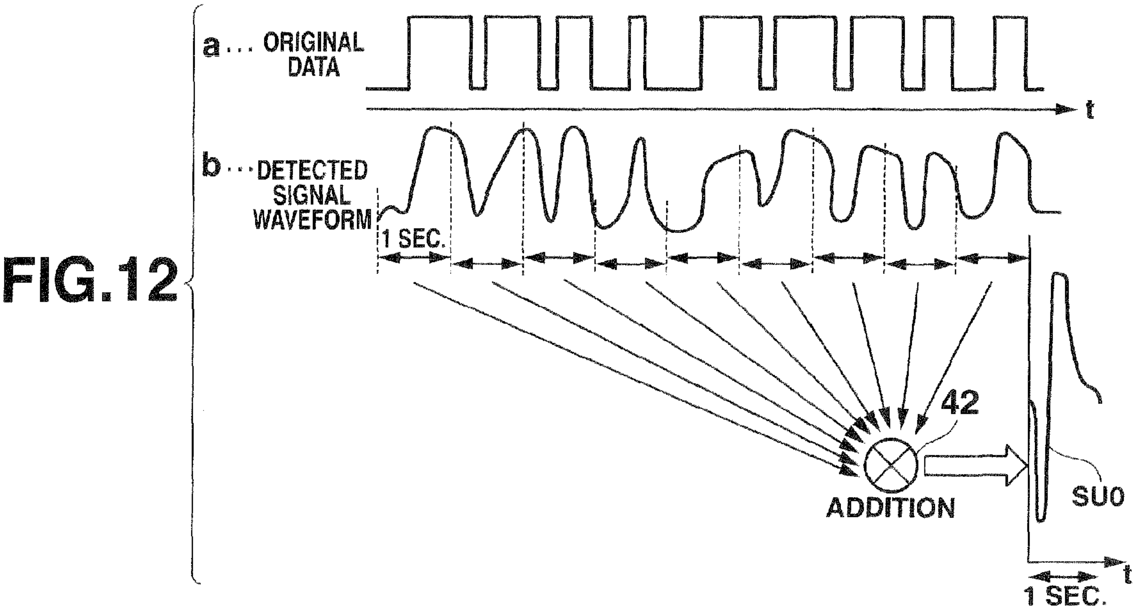
FIG. 12 shows an explanatory diagram of an operation of the synchronous detection unit shown in FIG. 11, FIG. 12-(*a*) shows waveforms of original data pulses, and FIG. 12-(*b*) shows waveforms of detected data pulses and a waveform of an added signal of the detected data pulses.

FIG. 12 shows an explanatory diagram of an operation of the synchronous detection unit 30A.

As shown in FIG. 12-(*b*), according to the synchronous detection unit 30A, when the time code signal contaminated with noise is inputted from the detection circuit 18, the respective detected signals in the time code signal in the respective intervals which are shifted by 1 second, are added by the adder 42 to generate the following combination signal.

That is, by adding a plurality of noise components, which contaminate the time code signal, to average the components, the combination signal has the same waveform as that of a combination signal generated by combining the noise-removed detected signals in the time code signal. Since a waveform of the noise-removed time code signal is a pulse waveform having rising portions at intervals of one second, the combination signal has a steep rising point SU0 at predetermined timing within one second.

Inputting such a combination signal into the CPU 23 through a comparator and an A/D converter, the CPU 23 can detect the rising point SU0 of the combination signal as a synchronization point.

SECOND EXAMPLE OF SYNCHRONOUS DETECTION UNIT

Figure 13:
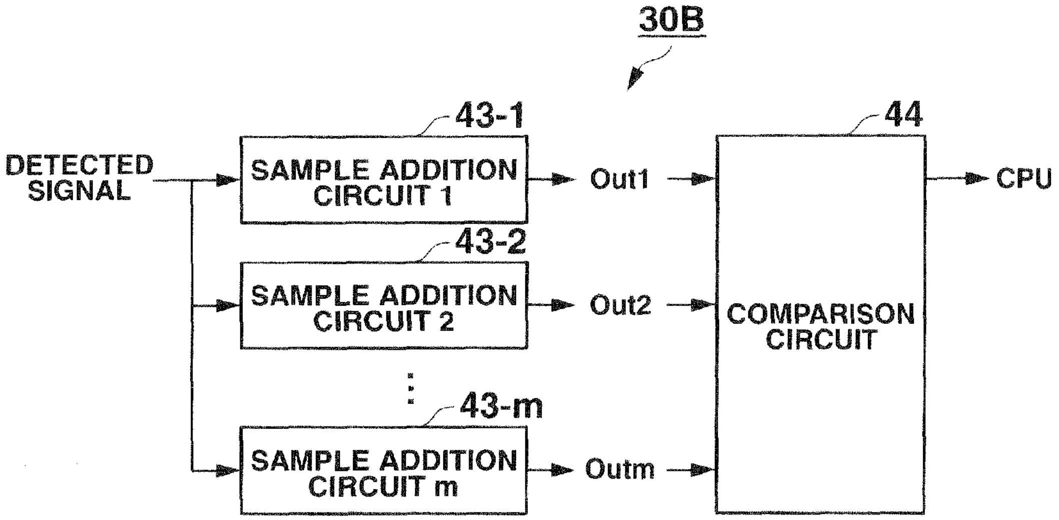
FIG. 13 is a block diagram showing a second exemplary synchronous detection unit capable of detecting synchronization points even when radio wave condition is poor.
Figure 14:
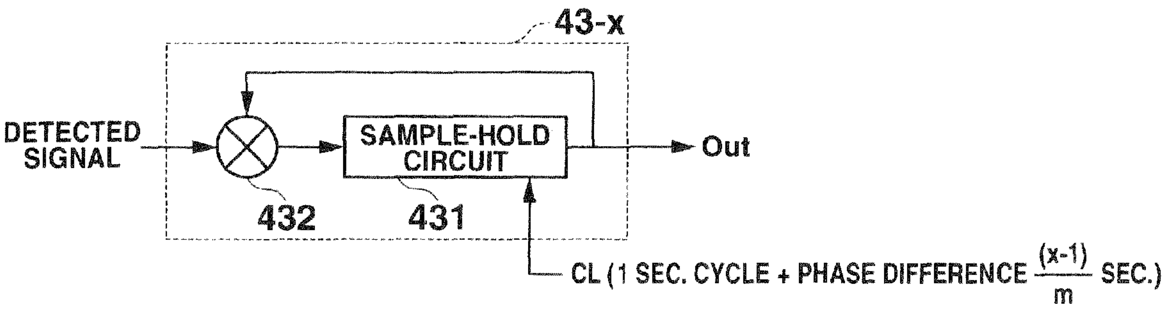
FIG. 14 shows a detailed circuit diagram of a sample addition circuit shown in FIG. 13.

FIG. 13 is a block diagram showing a second exemplary synchronous detection unit 30B capable of detecting the synchronization points even when the radio wave condition is poor. FIG. 14 shows a detailed circuit diagram of a sample addition circuit 43-*x* shown in FIG. 13.

The synchronous detection unit 30B includes m sample addition circuits 43-1 to 43-*m* and a comparison circuit 44 which compares outputs of the sample addition circuits 43-1 to 43-*m* by a predetermined procedure.

As shown in FIG. 14, a sample addition circuit 43-*x* (which refers to each of the sample addition circuits 43-1 to 43-*m*) includes a sample-hold circuit 431 for holding an input voltage based on a latch clock CL which is inputted at intervals of one second, and an adding circuit 432 for adding an output of the sample-hold circuit 431 to an amplitude level of the time code signal inputted from the detection circuit 18.

The latch clocks CL are inputted into the respective sample addition circuits 43-1 to 43-*m* at intervals of one second. The latch clocks CL are not inputted into the respective sample addition circuits 43-1 to 43-*m* simultaneously, but are inputted into the respective sample addition circuits 43-1 to 43-*m* at slightly different times. For example, if the number of the sample addition circuits is m, the latch clocks CL are sequentially inputted into the respective sample addition circuits 43-1 to 43-*m* at 1/m second different times.

Figure 15:
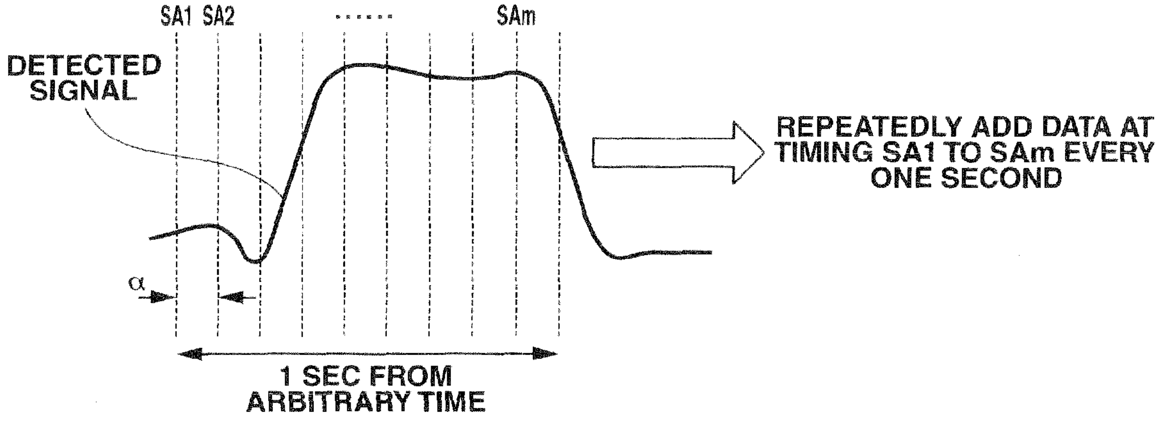
FIG. 15 shows an explanatory diagram of an operation of the synchronous detection unit shown in FIG. 13.

FIG. 15 shows an explanatory diagram of an operation of the synchronous detection unit 30B.

With the above-described structure, for example, the amplitude of the time code signal at arbitrary phase timing SA1 within a period of one second is repeatedly added by the first sample addition circuit 43-1 every one second. The amplitude of the time code signal at phase timing SA2 (1/m second from the phase timing SA1) is repeatedly added by the second sample addition circuit 43-2 every one second. Thus, the amplitudes of the time code signal at the respective phase timing SA1 to SAm within a period of one second are added by the respective sample addition circuits 43-1 to 43-*m*.

Accordingly, sampling data having a waveform obtained by adding the time code signal at one-second intervals a plurality of times, is represented based on output voltages Out1 to Outm of the sample addition circuits 43-1 to 43-*m*.

For example, assuming that ten sample addition circuits 43-1 to 43-10 are provided and time code signal is added during 30 seconds, the combination signal is obtained by combining the time code signal at one-second intervals 30 times, and output voltages Out1 to Out10 of the sample addition circuits 43-1 to 43-10 represent amplitude data of the combination signal at data sampling points of 0.1-second intervals.

That is, the output voltages Out1 to Out10 of the sample addition circuits 43-1 to 43-10 are equal to data of the combination signal shown in FIG. 12-(*b*) at data sampling points of 0.1-second intervals. Therefore, the synchronization point can be detected by finding the rising point SU0 of the combination signal based on the output voltages Out1 to Out10.

The comparison circuit 44 compares two adjacent output voltages of the output voltages Out1 to Outm, and determines phase timing at which a voltage difference between the two adjacent output voltages exceeds a predetermined value. For example, the comparisons are carried out with respect to all combinations of two adjacent output voltages, such as comparison between Out1 and Out2, and comparison between Out2 and Out3.

The output voltage Outm of the last sample addition circuit 43-*m* is compared with the output voltage Out1 of the first sample addition circuit 43-1. If there is phase timing at which the voltage difference between the two adjacent output voltages exceeds a predetermined value, the phase timing is determined as timing corresponding to the rising point SU0 of the combination signal (see FIG. 12-(*b*)), and the phase timing is outputted to the CPU 23 as detection timing of synchronization point.

THIRD EXAMPLE OF SYNCHRONOUS DETECTION UNIT

Figure 16:
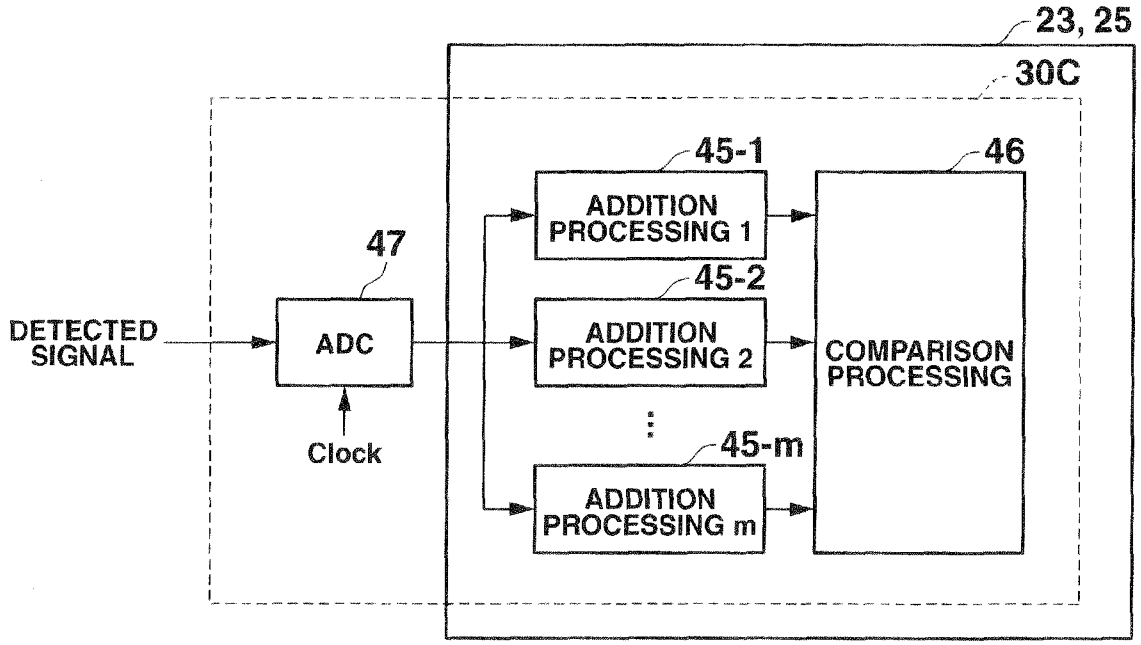
FIG. 16 is a block diagram showing a third exemplary synchronous detection unit capable of detecting synchronization points even when radio wave condition is poor.

FIG. 16 is a block diagram showing a third exemplary synchronous detection unit 30C capable of detecting the synchronization points even when the radio wave condition is poor.

In the synchronous detection unit 30C, addition processing of signal amplitude, which is executed by each of the sample addition circuits 43-1 to 43-*m* of the second exemplary synchronous detection unit 30B, is carried out by software processing by the CPU 23.

Therefore, in the third exemplary synchronous detection unit 30C, an A/D converter 47 samples the detected signal at specified time intervals into which a transmit period (one second) of each of the data pulses is divided, such as at 0.1 second intervals. The sampling data is transmitted to the CPU 23.

By the software processing by the CPU 23, m addition processing units 45-1 to 45-*m* perform the same addition processing as that performed by the sample addition circuits 43-1 to 43-*m* shown in FIG. 13, and a comparison processing unit 46 performs the same comparison processing as that performed by the comparison circuit 44 shown in FIG. 13 so that the rising point of the combination signal waveform can be detected. The addition processing units 45-1 to 45-*m* and the comparison processing unit 46 shown in FIG. 16 are functional blocks which are realized by the CPU 23 and developed in the RAM 25.

This configuration allows the CPU 23 to virtually execute the same processing as that executed by the synchronous detection unit 30B shown in FIG. 13. Therefore, it is possible to detect the synchronization points in the noise-contaminated time code signal.

It should be noted that the wave clock and the radio wave receiver of the present invention are not to be considered limited to what is shown in the above-described embodiments. It will be apparent to those skilled in the art that various modification and variations can be made in the wave clock and the radio wave receiver.

For example, a superheterodyne system is employed in the receiving unit 20 in the above-described embodiments. Instead of the superheterodyne system, a straight system may be employed in the receiving unit 20.

In the above-described embodiments, the comparator 22 compares the output of the low-pass filter 21 with the threshold voltage, and the data pulse distinction is performed using the comparison result. A/D converter may sample the output of the low-pass filter 21, and the data pulse distinction may be performed using the sampling data, though this processing may lead to a heavy processing load.

The data pulse distinction can be realized even when each of the first data detection timing T1 and the second data detection timing T2 shown in FIG. 6 is shifted by about 0.2 second. The threshold voltage Vth of the comparator 22 may be changed to facilitate the data pulse distinction.

FIGS. 18A to 18E show an explanatory diagram of data pulses constituting a time code of each country. Even if a format of the data pulses differs from country to country as shown in FIGS. 18A to 18E, the above-embodiments of the present invention can be applied in response to the format of each country.

FIGS. 18A to 18E show types of data pulse in Japan, United States of America, Germany, Switzerland, and United Kingdom, respectively. In the data pulse format in Japan shown in FIG. 18A, the synchronization points are set to timing of rising edges of the pulses. Applying this method to the formats in other countries, the synchronization points may be set to timing of downward edges of the pulses.

The waveform of the signal that has passed through the low-pass filter 21 differs from country to country according to types of data pulse. However, because there is a point at which the signal value drastically changes within one second according to types of data pulse, the data pulse distinction still can be executed based on the signal value at that point.

With respect to the detailed configurations and methods in the above-described embodiments, such as the configurations of the low-pass filter 21 and 21B, and procedures for data pulse distinction, it will be apparent to those skilled in the art that various modification and variations can be made without departing from the scope of the invention.

What is claimed is:

1. A radio wave receiver comprising:

a receiving unit to receive a radio wave including a time code in which a plurality of types of data pulse different in pulse width from one another are arranged with a predetermined period of time;

a detection circuit to detect the time code in the radio wave received by the receiving unit to obtain a detected signal;

a low-pass filter to pass low-frequency components in the detected signal detected by the detection circuit, a cutoff frequency of the low-pass filter being twice a transmit frequency of the data pulse or less; and a data distinction unit to distinguish the types of data pulse based on an output of the low-pass filter for at least one specific point of time during a transmit period of data pulse.

2. The radio wave receiver according to claim 1, wherein the cutoff frequency of the low-pass filter is 0.5 to 1.0 times as low as the transmit frequency of the data pulse.

3. The radio wave receiver according to claim 1, further comprising a reset unit to remove charges remaining in the low-pass filter every time the types of data pulse are distinguished by the data distinction unit.

4. A wave clock comprising:

the radio wave receiver of claim 1; and a time calibration unit to correct time based on the time code after the types of data pulse are distinguished.

5. A radio wave receiver comprising:

a receiving unit to receive a radio wave including a time code in which a plurality of types of data pulse different in pulse width from one another are arranged with a predetermined period of time;

a detection circuit to detect the time code in the radio wave received by the receiving unit to obtain a detected signal;

a low-pass filter to pass low-frequency components in the detected signal detected by the detection circuit, when one of the types of data pulse which has a largest pulse is received, charges stored in the low-pass filter remaining at an end of a transmit period of the one of the types of data pulse;

a data distinction unit to distinguish the types of data pulse based on an output of the low-pass filter for at least one specific point of time during a transmit period of data pulse; and a reset unit to remove the charges remaining in the low-pass filter every time the types of data pulse are distinguished by the data distinction unit.

6. The radio wave receiver according to claim 5, wherein the data distinction unit comprises:

a comparator to compare the output of the low-pass filter with a threshold voltage; and a logic circuit to distinguish the types of data pulse based on an output of the comparator for the at least one specific point of time during a transmit period of data pulse.

7. The radio wave receiver according to claim 5, wherein the plurality of types of data pulse include a position marker pulse whose pulse width is 0.2 second, "1" data pulse whose pulse width is 0.5 second, and "0" data pulse whose pulse width is 0.8 second, and the data distinction unit is configured to distinguish between the position marker pulse, the "1" data pulse and the "0" data pulse, based on the output at a first detection timing and the output at a second detection timing, the first detection timing being a point of time between 0.3 to 0.7 second from a starting point of the transmit period of data pulse, and the second detection timing being a point of time after the first detection timing between 0.6 to 1.0 second from a starting point of the transmit period of data pulse.

8. The radio wave receiver according to claim 5, wherein when the types of data pulse cannot be distinguished based on the output of the low-pass filter, the data distinction unit distinguishes the types of data pulse again with reference to a previously received data pulse.

9. The radio wave receiver according to claim 5, further comprising:

a synchronous detection unit to detect a starting point of the transmit period of data pulse; and a control unit to cause the synchronous detection unit to newly detect the starting point when the types of data pulse cannot be distinguished successively by the data distinction unit, and cause the receiving unit to receive the time code again using the starting point newly detected by the synchronous detection unit.

10. The radio wave receiver according to claim 5, further comprising:

a switching unit to switch between a plurality of frequency characteristics of the low-pass filter; and a control unit to cause the switching unit to switch to a lower cutoff frequency of the low-pass filter when subsequent transmit timing of one of the plurality of types of data pulse is identified by distinguishing the types of data pulse by the data distinction unit at predetermined time intervals, and cause the data distinction unit to distinguish between a rest of the types of data pulse.

11. A wave clock comprising:

the radio wave receiver of claim 5; and a time calibration unit to correct time based on the time code after the types of data pulse are distinguished.

* * * * *